Patented Apr. 15, 1941

2,238,726

UNITED STATES PATENT OFFICE 2,238,726

CONVERSION OF CARBON OXIDES INTO HIGHER HYDROCARBONS

Walter Feisst, Hans Neweling and Otto Roelen, Oberhausen-Holten, Germany, assignors, by mesne assignments, to Hydrocarbon Synthesis Corporation, Linden, N. J.

No Drawing. Application December 4, 1936, Serial No. 114,186. In Germany December 10, 1935

9 Claims. (Cl. 260—449)

Our invention relates to the production of hydrocarbons and more especially to the conversion of oxides of carbon into higher hydrocarbons by interaction in the presence of catalysts with hydrogen or gas mixtures containing hydrogen.

When converting carbon monoxide in the presence of a catalyst into higher hydrocarbons by interaction with hydrogen according to the method of Franz Fischer and Hans Tropsch as disclosed in U. S. Letters Patent No. 1,746,464, it has been found that after a comparatively short time the efficiency of the catalysts is reduced. One has hitherto tried to compensate the reduction of yield resulting therefrom by raising the temperature. However such rise of temperature is only possible within narrow limits and consequently the regeneration of the reaction can only be obtained during a short time. For a further raising of the temperature becomes impossible in view of the large quantities of methane, which are then formed. Thus the catalyst must be replaced after a comparatively short time by fresh catalyst masses and the spent catalyst cannot be simply regenerated.

We have now found that it is possible to greatly lengthen the life of the catalysts used in the method of Fischer and Tropsch mentioned above by removing in short intervals from the catalysts those substances, such as for instance high melting paraffins, which are settled on the catalysts and paralyse its action. This periodical removal should take place before the substances appreciably impair the catalytic efficiency.

It is a well known fact that in the synthetical production of hydrocarbons the active life of a catalyst will be the longer, the lower the temperature of reaction, but in spite of this knowledge the active life of the catalysts did not last longer than one to two months and even within such periods of time the maximum yields could not be permanently obtained, while after the lapse of one to two months the catalyst had to be regenerated outside of the reaction chamber, since it appeared impossible to permanently obtain the desired yield at low temperatures of reaction.

The paralyzing effect of the non-volatile reaction products deposited on the catalyst will be felt already after a few days. According to the present invention these products are removed from the catalyst within short intervals and we thus succeed in restoring the original catalytic efficiency without the reaction temperature being raised.

If for example the non-volatile reaction products are continuously removed to a sufficient extent and in regular intervals from a cobalt catalyst, the life of the catalyst is greatly lengthened and its catalytic efficiency kept at the same high level without the reaction temperature being required to be raised materially above the initial favorable temperature. It has thus been found possible to permanently keep the reaction temperature so low, that in the catalyst no obnoxious quantities of such foreign by-products could settle down, which are formed only at higher temperatures and cannot be removed in any known manner from the catalyst within the reaction chamber.

When recommending to always operate at constant temperature, we intend this to mean that a slight rise of temperature shall not be excluded, provided only that it does not bring about any obnoxious effect. For instance, if the synthetical process is carried out at first at 185° C., a rise to about 190° C. shall not be excluded.

The removal of the non-volatile reaction products may for instance be effected by extracting these products from the catalytical mass by means of solvents or mixtures of solvents, for instance with the aid of benzene or alcohols, or of suitable fractions of the oils formed in the synthetical process itself. In the practical operation of the present invention it has been found particularly advantageous to carry through this extraction in the synthesis chamber itself without the catalyst mass being withdrawn.

We have further found that the non-volatile reaction products can be removed from the catalyst in a particularly simple manner by treating the catalyst with hydrogen or gases or vapors containing hydrogen or splitting off hydrogen, for instance with steam, and these gases or vapors can be used either by themselves or several in succession or mixtures of same may be used.

It is particularly important to note that this treatment can be successfully applied even at the low temperatures, for instance ranging between 180 and 200° C., of the synthetical process. For this reason the treatment of the catalyst with hydrogen can also be carried through in the synthesis chamber itself, even in the case, where the chamber is operated with water under pressure or with oil circulation as heat regulating agents, which are known not to admit any materially higher operating temperatures.

It has been found particularly useful to first extract the catalyst with a solvent and to thereafter treat it with hydrogen in the manner above described.

The time intervals, within which the catalyst is regenerated, may vary within certain limits. If for instance a slight drop of catalytic efficiency, say of 5%, is permitted between successive regeneration treatments, it will be sufficient to effect the regeneration in intervals of several days, for instance 8 days. In any case the initial activity is restored by a removal of the non-volatile substances, not by raising the reaction temperature. The shorter the intervals between successive regeneration operations, the lower will be the drop of efficiency between the intervals. Regeneration may be effected for instance every two to three days or once or even several times per day and in such a case a practically constant high yield is obtained.

If the non-volatile reaction products are removed from the catalyst within sufficiently short intervals of time, the fluctuations in the performance of the furnace will become so insignificant, that automatically operating means may be used for reversing the gas supply and for blowing out the gases or vapors used in the operation.

We have found it to constitute a particular advantage of the method according to this invention, that the average yield of liquid products is much higher than has hitherto been obtained, in any process whatsoever, with the same type of catalyst. We have also found that the new process enables us to considerably increase the yields of the desired higher molecular weight fractions of the reaction products as compared with synthetical processes in which no regeneration in short intervals, but a gradual rise of temperature, is resorted to.

In the practical operation of the process according to our invention we may for instance proceed as follows:

Example 1

Through the synthesis chamber charged with a cobalt-thorium-kieselguhr catalyst a gas mixture consisting of 28 to 29% carbon monoxide, 56 to 60% hydrogen, the remainder being carbon dioxide and nitrogen, is passed at a temperature of about 185 to 190° C.

The catalyst is prepared by precipitating a solution containing a cobalt salt and a thorium salt with an aqueous sodium carbonate solution, the precipitate settling on kieselguhr contained in the salt solution. The catalyst when separated from the solution by filtration and dried is reduced first with hydrogen at 300 to 350° C. and then contains 37.3% cobalt, 6.7% thorium oxide and 56.0% kieselguhr.

4 liters of the gas mixture are passed hourly over the catalyst per every 10 grams catalyst. The products resulting in the synthetical reaction are hydrocarbons of the benzine type and higher boiling hydrocarbons of the paraffin and olefine series. The highest boiling point of the hydrocarbon oils is above 300 and ranges about between 320 and 350° C. Besides the liquid hydrocarbons there are as a rule also obtained solid hydrocarbons of paraffin character. The proportion of benzines and oils depends from the conditions of reaction; in the practical operation about 40 to 50% benzine boiling up to 200° and 60 to 50% oils boiling from 200 to about 350° C. are obtained.

Every 24 hours a quantity of hydrogen equal to the quantity of gas under treatment is passed during one hour at 180 to 185° C. through the furnace and the high molecular paraffin hydrocarbons formed during the synthetic process and settled on the catalyst are thereby withdrawn partly under the form of solid paraffin or of high boiling oils or in part as methane or other hydrocarbon gases.

Directly after the treatment with hydrogen has come to an end, the gas mixture under treatment is again passed in contact with the catalyst, which will at once form 100 to 110 grams liquid products per cubic meter gas mixture.

We have thus succeeded in carrying the operation on during many months without being required to charge the furnace with fresh catalyst.

If it is desired to extract part of the higher molecular hydrocarbons to be removed from the catalyst without any material change, we treat the catalyst first with steam and only thereafter with hydrogen.

Example 2

In order to convert a material proportion of the carbon monoxide into high melting paraffin, a mixture of carbon monoxide and hydrogen such as described with reference to Example 1 is passed at a temperature of about 250° C. in contact with an alkalinised iron catalyst obtained by heating ferric nitrate to convert it into ferric oxide which is then treated with 1 to 2% potassium carbonate, whereupon the mixture is reduced with hydrogen. This contact consists of about 98% metallic iron and about 2% potassium carbonate.

In intervals of four days the temperature of the catalyst is lowered to about 110° and the high melting paraffin is extracted from the catalyst within the synthesis chamber with the aid of a benzine fraction boiling between 130 and 140° C. After the extraction has come to an end, hydrogen is passed through the catalyst, the temperature being at the same time raised to about 250° C. Shortly after this temperature has been reached, the starting gas mixture is again passed in contact with the catalyst and the synthetical process continued during about four days, before another regeneration operation is resorted to. The extracted solution is subjected to distillation to separate the solvent from the high melting paraffin.

Instead of regenerating the catalyst and more especially catalysts containing nickel and/or cobalt, with hydrogen or gases or vapors containing hydrogen or splitting off hydrogen, we have found that it may be advantageous to use, in the regeneration step, such gas mixtures containing hydrogen, which have already been freed from most of the carbon oxides contained therein, since even the partly spent catalyst would reduce the carbon oxides in contact with the hydrogen to methane, which would lead to losses of hydrogen. We therefore prefer using, instead of a mixture of hydrogen and carbon oxide, the mixture of hydrogen and nitrogen used in the synthetical production of ammonia.

It has further been found particularly useful to operate the regeneration step under increased pressure, preferably under a pressure ranging between about 10 and 150 atmospheres above normal.

Example 3

Through a cobalt-thorium-kieselguhr catalyst of the kind described with reference to Example 1, the gas mixture described in the same example passed. After the lapse of 24 hours the synthetical process is interrupted and hydrogen under a pressure of 10 atmospheres above normal is passed during one hour through the synthesis chamber. The hydrogen gas escaping from the chamber, which is mixed with hydrocarbon gases and vapors, is allowed to expand and is cooled. Already during the cooling operation part of the hydrocarbon vapors extracted from the catalyst will separate out, while the residual gas is passed through an adsorption tower charged with activated carbon in order to recover the residual hydrocarbons, while the gases escaping from the tower are discarded.

A mode of operating the process according to this invention may be described more in detail as follows:

The gas mixture of carbon monoxide and hydrogen is introduced, at the rate of about from 50 to 500 liters hourly through 1 liter reaction space, into a synthesis chamber from which the gases formed in the reaction are passed into a water-cooled condenser. Here part of the condensable products is separated out and these products collect in a container from which they may pass into a reservoir. The non-condensable gases and vapors are passed from said container into an adsorption tower filled with activated carbon from the top of which the residual gas mixture is permitted to escape. In order to expel the hydrocarbons, steam is introduced into the adsorption tower; while this expulsion takes place, gases and vapors escaping from the tower are caused to pass into another condenser. The condensable products collect in a settling tank from which they pass into a separator, to be separated into a water layer and a supernatant oil layer, while the non-condensable gases are permitted to escape from the separator. While the water is tapped from the separator, the condensed hydrocarbons are fed through an overflow tube to the above-mentioned reservoir which is provided with a pressure compensation tube.

When the synthetic process has been carried through for about 24 hours, the supply of the gas mixture of carbon monoxide and hydrogen is cut off and hydrogen gas, if desired under pressure, is fed to the synthesis chamber instead, for the purpose of regenerating the catalyst. The organic substances settled on the catalyst are now partly decomposed and the hydrogen escaping from the furnace is now mixed with hydrocarbon fractions, which are recovered in the manner before described by cooling in the condenser and adsorption in the adsorption tower. The expulsion of the organic substance adsorbed by the activated carbon also occurs with the aid of steam as before described. The vapor mixture consisting of hydrocarbons and steam is condensed in the condenser and the products collecting in the separator are separated in the separator into water and hydrocarbon oils. These oils, which escape through the overflow tube, are collected in the reservoir.

In order to regenerate the catalysts in time, hydrogen or a gas mixture containing hydrogen and free from carbon oxides is thus continuously passed through the synthesis chamber and from the gases escaping from this chamber the condensable and readily adsorbable constituents are separated by condensation and treatment with activated carbon, while the residual gas escaping from the adsorption tower is discarded.

For instance if a gas containing 25% nitrogen and 75% hydrogen and which is free from impurities, such as the mixture used in the synthetical production of ammonia, is used in the regeneration of the catalysts, the residual gas escaping from the adsorption tower may for instance contain, besides nitrogen and 20% methane, also 45% hydrogen, so that only about one third of the hydrogen introduced into the synthesis chamber, is consumed in the regeneration of the catalysts.

Hitherto this residual gas was not reused for regenerating the catalysts, since we had assumed that the gases, which would then form, such as methane, might impair the further regeneration of the catalysts.

We have now further found that we can effect a considerable saving in hydrogen by recirculating the greater part of the residual gases still containing hydrogen through the synthesis chamber to be regenerated, and supplying to the chamber during the regeneration process only a correspondingly smaller proportion of fresh hydrogen.

While for instance formerly 100 cubic meters of a gas mixture such as used in the synthetical production of ammonia and containing 25% nitrogen and 75% hydrogen were continuously passed per hour through the synthesis chamber, this regenerating of the catalyst requiring the passing through of this gas mixture during about 8 hours, we may now return for instance about 80% of the residual gas mixture escaping from the adsorption tower into the synthesis chamber and are therefore only required to introduce into the chamber about 20 cubic meters fresh gas containing hydrogen per hour. The recirculation of the residual gases results in a farther reaching utilisation of the hydrogen contents so that that part of the residual gas, which is not recirculated through the synthesis chamber, contains for instance, besides 50% methane and 25% nitrogen, only 25% hydrogen, so that according to this modification of our process 60 to 70% of the hydrogen hitherto used in the regeneration of the catalysts can be saved.

Various changes may be made in the details disclosed in the foregoing specification without departing from the invention or sacrificing the advantages thereof.

We claim:

1. In the process of converting carbon oxides into higher hydrocarbons by acting thereon with gases containing free hydrogen which are practically free from other reactants, at a temperature ranging between about 180° C. and about 250° C., in the presence of a catalyst which is suitable for forming higher-molecular hydrocarbons, the step of periodically removing from the catalyst the non-volatile reaction products, which have settled on the catalyst, at a temperature not materially above the reaction temperature, each time before these reaction products have been able to impair the efficiency of the catalyst by substantially more than 5%.

2. The process of claim 1, in which the catalyst is first extracted with a solvent for paraffin and thereafter treated with a gas containing hydrogen and being free from carbon oxides.

3. In the process of converting carbon oxides into higher hydrocarbons by acting thereon with gases containing free hydrogen which are practically free from other reactants, at a temperature ranging between about 180° C. and about 250° C., in the presence of a catalyst which is suitable for forming higher-molecular hydrocarbons, the step of removing about every fourth day from the catalyst in the reaction zone the non-volatile reaction products, which have settled on the catalyst, by extraction with a solvent for paraffin at a temperature not materially above the reaction temperature.

4. In the process of converting carbon oxides into higher hydrocarbons by acting thereon with gases containing free hydrogen which are practically free from other reactants, at a temperature ranging between about 180° C. and about 250° C., in the presence of a catalyst which is suitable for forming higher-molecular hydrocarbons, the step of periodically removing from the catalyst under a pressure above normal the non-volatile reaction products, which have settled on the catalyst, at a temperature not materially above the reaction temperature, each time before these reaction products have been able to impair the efficiency of the catalyst by substantially more than 5%.

5. In the process of converting carbon oxides into higher hydrocarbons by acting thereon with gases containing free hydrogen which are practically free from other reactants, at a temperature ranging between about 180° C. and about 250° C., in the presence of a catalyst which is suitable for forming higher-molecular hydrocarbons, the step of removing about every fourth day from the catalyst in the reaction zone the non-volatile reaction products, which have settled on the catalyst, at a temperature not materially above the reaction temperature by extraction with a fraction of oil produced in the catalytical conversion process.

6. In the process of converting carbon oxides into higher hydrocarbons by acting thereon with hydrogen or gases containing free hydrogen, which are practically free from other reactants, at a temperature ranging between about 180° C. and about 250° C., in the presence of a catalyst, which is suitable for forming higher-molecular hydrocarbons, the step of periodically passing through the catalyst in the reaction zone at a temperature not materially exceeding the reaction temperature a gas containing hydrogen and being free from carbon oxides to expel the non-volatile reaction products which have settled on the catalyst, each time before they have been able to impair the efficiency of the catalyst by substantially more than 5%.

7. The process of claim 6, in which the greater part of the gases used in the expulsion of the non-volatile reaction products are freed from the condensable and readily absorbable admixtures and recirculated together with relatively small quantities of fresh hydrogen containing gas into the reaction zone for the expulsion of further quantities of non-volatile reaction products from the catalyst.

8. The process of claim 6, in which there is first passed through the catalyst in the regeneration step steam and thereafter hydrogen.

9. The process of claim 6, in which a mixture of hydrogen and nitrogen is used for the regeneration of the catalyst.

WALTER FEISST.
HANS NEWELING.
OTTO ROELEN.